US00RE46960E

(19) United States
(12) Reissued Patent
Baker et al.

(10) Patent Number: US RE46,960 E
(45) Date of Reissued Patent: Jul. 17, 2018

(54) METHOD OF OPERATING A COMMUNICATION DEVICE AND A SYSTEM, A COMMUNICATION DEVICE AND A SYSTEM INCLUDING THE COMMUNICATION DEVICE

(71) Applicant: KONINKLIJKE PHILIPS N.V., Eindhoven (NL)

(72) Inventors: Matthew P. J. Baker, Canterbury (GB); Paul Bucknell, Brighton (NL)

(73) Assignee: Koninklijke Philips N.V., Eindhoven (NL)

(21) Appl. No.: 14/818,901

(22) Filed: Aug. 5, 2015

Related U.S. Patent Documents

Reissue of:
(64) Patent No.: 8,504,085
Issued: Aug. 6, 2013
Appl. No.: 12/063,044
PCT Filed: Aug. 9, 2006
PCT No.: PCT/IB2006/052745
§ 371 (c)(1),
(2) Date: Feb. 6, 2008
PCT Pub. No.: WO2007/017837
PCT Pub. Date: Feb. 15, 2007

(30) Foreign Application Priority Data

Aug. 10, 2005 (EP) ..... 05107363
Aug. 11, 2005 (EP) ..... 05107411

(51) Int. Cl.
*H04W 40/00* (2009.01)
*H04W 72/12* (2009.01)
(Continued)

(52) U.S. Cl.
CPC ..... *H04W 72/1289* (2013.01); *H04W 28/18* (2013.01); *H04W 52/16* (2013.01); *H04W 72/0473* (2013.01)

(58) Field of Classification Search
CPC . H04W 72/1289; H04W 28/18; H04W 52/16; H04W 72/0473
See application file for complete search history.

(56) References Cited

U.S. PATENT DOCUMENTS 6,810,038 B1 * 10/2004 Isoyama et al. ..... 370/395.42
7,116,651 B2 * 10/2006 Hakkinen et al. ..... 370/329
(Continued)

FOREIGN PATENT DOCUMENTS

EP 1708523 A1 10/2006

OTHER PUBLICATIONS

Stefan Parkvall: UE Grant Behaviour, http://list.etsi.org/scripts/wa.exe? A2=IND0410&L=3GPP_TSG_RAN_WG7_AH&P=R154011&1=3&T., Oct. 15, 2004, XP002375262.
(Continued)

*Primary Examiner* — Jeffrey Carlson

(57) ABSTRACT

A communication system, such as UMTS, comprises a scheduler (12) in a first station (PS) which is able to control a user equipment (UE1, UE2). The scheduler when operating in a data transmission mode, such as HSUPA (High-Speed Uplink Packet Access) controls the user equipment with combinations of absolute grants (AG) and relative grants (RG). The relative grants serve to adapt a transmission parameter relative to a reference value. The reference value for the relative grant is selected dependent on a property of one or more of the grants. Such a property may comprise the absolute grant being an all process grant or a single process grant.

68 Claims, 4 Drawing Sheets

(51) Int. Cl.

| | |
|---|---|
| *H04W 52/16* | (2009.01) |
| *H04W 72/04* | (2009.01) |
| *H04W 28/18* | (2009.01) |

(56) References Cited

U.S. PATENT DOCUMENTS

| | | | | |
|---|---|---|---|---|
| 7,155,236 | B2 * | 12/2006 | Chen et al. | 455/454 |
| 7,162,262 | B2 * | 1/2007 | Jonsson et al. | 455/522 |
| 7,321,589 | B2 * | 1/2008 | Lohr et al. | 370/394 |
| 7,339,998 | B2 * | 3/2008 | Murata et al. | 375/260 |
| 7,418,273 | B2 * | 8/2008 | Tomoe et al. | 455/561 |
| 7,561,550 | B2 * | 7/2009 | Kwak et al. | 370/331 |
| 7,630,733 | B2 * | 12/2009 | Usuda et al. | 455/522 |
| 7,701,922 | B2 * | 4/2010 | Terry | 370/349 |
| 7,756,087 | B2 * | 7/2010 | Kim et al. | 370/335 |
| 7,843,875 | B2 * | 11/2010 | Somasundaram et al. | 370/329 |
| 7,860,052 | B2 * | 12/2010 | Lohr et al. | 370/329 |
| 7,876,727 | B2 * | 1/2011 | Hwang | 370/331 |
| 7,894,444 | B2 * | 2/2011 | Lohr et al. | 370/394 |
| 8,000,291 | B2 * | 8/2011 | Pinheiro et al. | 370/329 |
| 8,014,359 | B2 * | 9/2011 | Cave et al. | 370/332 |
| 8,116,292 | B2 * | 2/2012 | Terry | 370/342 |
| 8,125,944 | B2 * | 2/2012 | Love et al. | 370/328 |
| 8,139,534 | B2 * | 3/2012 | Goto et al. | 370/329 |
| 8,243,676 | B2 * | 8/2012 | Pinheiro et al. | 370/329 |
| 8,320,307 | B2 * | 11/2012 | Niwano | 370/329 |
| 8,358,614 | B2 * | 1/2013 | Pani et al. | 370/328 |
| 2004/0162083 | A1 * | 8/2004 | Chen et al. | 455/454 |
| 2005/0249133 | A1 * | 11/2005 | Terry | H04L 1/0025 370/278 |
| 2006/0018282 | A1 * | 1/2006 | Kwak et al. | 370/331 |
| 2006/0092876 | A1 * | 5/2006 | Kwak et al. | 370/329 |
| 2006/0104242 | A1 * | 5/2006 | Kim et al. | 370/329 |
| 2006/0268938 | A1 * | 11/2006 | Terry | 370/477 |
| 2007/0047452 | A1 * | 3/2007 | Lohr et al. | 370/242 |
| 2007/0281688 | A1 * | 12/2007 | Tajima | 455/433 |
| 2007/0297360 | A1 * | 12/2007 | Joachim et al. | 370/329 |
| 2008/0008152 | A1 * | 1/2008 | Lohr et al. | 370/342 |
| 2008/0069035 | A1 * | 3/2008 | Pinheiro et al. | 370/328 |
| 2008/0225764 | A1 * | 9/2008 | Tseng | 370/310 |
| 2008/0254804 | A1 * | 10/2008 | Lohr et al. | 455/442 |
| 2009/0201870 | A1 * | 8/2009 | Goto et al. | 370/329 |
| 2010/0157895 | A1 * | 6/2010 | Pani et al. | 370/328 |
| 2010/0172303 | A1 * | 7/2010 | Love et al. | 370/328 |
| 2010/0220647 | A1 * | 9/2010 | Baker et al. | 370/328 |
| 2010/0329136 | A1 * | 12/2010 | Murata et al. | 370/252 |
| 2011/0299497 | A1 * | 12/2011 | Pinheiro et al. | 370/329 |
| 2012/0281660 | A1 * | 11/2012 | Pinheiro et al. | 370/329 |
| 2013/0022028 | A1 * | 1/2013 | Niwano | 370/335 |

OTHER PUBLICATIONS

Samsung: Node B Controlled Scheduling, http://www.3GPP.org/ftp/tsg_ran/WG1_RL1/TSGR1_38/Docs/Zips., Aug. 16, 2004, XP002367155.

Samsung, "EUL scheduling: signalling support", 3GPP TSG-RAN WG1 Meeting # 38bis, Sep. 20-24, 2004, 10 pages.*

Samsung: EUL Scheduling: Signalling Support, 3GPP TSG RAN WGI Meeting #38BIS, Sep. 20, 2004, pp. 1-6.

UMTS: Universal Mobile Telecommunications Systems, ETSI Standard, Telecommunications Standard Institute, vol. 3-R2, No. V650, Jun. 2005, pp. 1-85.

* cited by examiner

METHOD OF OPERATING A COMMUNICATION DEVICE AND A SYSTEM, A COMMUNICATION DEVICE AND A SYSTEM INCLUDING THE COMMUNICATION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a method of operating a communication device and system, to a communication device and to a system including the communication device. The present invention has particular, but not exclusive, application to mobile communication systems, such as UMTS (Universal Mobile Telecommunication System), especially in relation to fast scheduling schemes such as used in High-Speed Uplink Packet Access (HSUPA).

BACKGROUND ART

For convenience of description the present invention will be described with reference to the UMTS system.

A typical UMTS system architecture is shown in FIG. 1 of the accompanying drawings and comprises at least one primary (or base) station PS and a plurality of secondary stations, generally referred to as User Equipments (UEs), UE1, UE2. Communication between the primary station PS and each of the Ues is by radio links consisting of a downlink from the primary station PS to a UE and an uplink from the UE to the primary station PS.

A data packet protocol is used for controlling the transmission of data packets between the or each primary station PS and the UEs in the relevant service area. In UMTS the uplink data packet standard is still evolving and with respect to High-Speed Uplink Packet Access (HSUPA) the latest version of the MAC specifications is 3GPP document 25.321. FIG. 2 of the accompanying drawings illustrates that with HSUPA each UE can have up to eight active Hybrid Automatic Repeat Request (HARQ) processes HARQ 1 to HARQ 8, which are transmitted in turn in successive Transmission Time Intervals (TTIs) TTI 1 to TTI 8 (i.e. synchronous HARQ) on an uplink (UL). For convenience of description the group of TTIs 1 to 8 will be collectively referred to as a frame FR. Depending on whether or not a data packet is received satisfactorily, a scheduler in the primary station PS causes a positive or negative acknowledgement ARQ1 to ARQ 8 to be transmitted on the downlink (DL) and in response the UE either sends a new data packet or resends the previous data packet. An uplink transmission can also comprise an uplink control signal.

The transmission rate for these processes is set according to a "Serving Grant" (SG) variable which is stored in the UE. The SG is a record of at what rate and/or power and/or power ratio a UE can transmit at until a new grant is received from the primary station. The value of the SG can be updated by "all-process" (i.e. common) absolute grants (AG), or by process-specific "single-process" absolute grants, or by relative grants (RG). An AG gives an indication of the new SG whereas a RG is an indication of an incremental or decremental change to SG relative to the data transmission rate in the correspondingly numbered TTI in the previous frame FR.

All-process absolute grants (AG) change the value of the SG without affecting which of the processes are active, whereas single-process absolute grants set the indicated process to active or inactive as well as updating the value of the SG. The nature of absolute grants (all-process or single-process) is indicated by an "all process" flag which is sent together with the grant value.

Relative grants (RG) are associated with a particular HARQ process by means of a predetermined timing relationship. A relative grant sets the SG relative to the data transmission power and/or rate used for the previous transmission of the HARQ process in question. Note that, as this sets the SG, the implementation of a RG also affects subsequent transmissions on different HARQ processes in the same way as AGs.

UEs maintain a Serving Grant and the list of active HARQ processes based on the received absolute grant and relative grant commands. Each absolute grant or relative grant command is applied at a specific TTI.

The above behaviour can give undesirable results in some cases when absolute and relative grants are received in sequence.

FIG. 3 of the accompanying drawings shows a case when a UE's SG is set at a first value referenced 30 in TTI1, during which TTI the UE transmits data using HARQ process 1, using the maximum data transmission power (or rate in some embodiments) indicated by the SG. In subsequent TTIs, the UE may transmit data using the corresponding consecutively-numbered HARQ processes.

For TTI 2, the UE receives an AG to reduce the SG to a second value referenced 32. For TTI 9 (which is the first TTI in the next following frame), the network wishes to reduce the UE's data transmission power by a further 1 dB, but without the relatively high signalling overhead associated with sending a AG. Normally a RG would be the appropriate way to achieve such a reduction in data transmission power with a low signalling overhead, but in this case a "down" relative grant would be applied relative to the transmission power actually used in TTI 1, that is the SG level 30, which would therefore result in an unwanted increase in the data transmission power, to a level 34, compared to the SG level 32 used in the previous 7 TTIs (which followed the constraint imposed in TTI 2 by the absolute grant), that is TTI 2 to TTI 8.

According to the current behaviour, the network therefore has no way to reduce the SG in TTIs 2-9 without using another AG with its associated overhead in signalling (or waiting till TTI 10).

Likewise, the network has no way to increase the SG by one step (e.g. +1 dB in some embodiments) relative to the value in TTIs 2-9, as an "up" RG of 1 dB in TTI 9 could cause the SG to be raised by much more than one step or increment relative to the SG level 32, to a level 36, as shown in FIG. 4 of the accompanying drawings.

One way of describing this behaviour is to say that the selection of the reference value for the RGs gives priority to RGs over AGs. This may not always be appropriate or desirable.

DISCLOSURE OF INVENTION

An object of the present invention is to overcome the drawback of the known method of controlling data transmissions using scheduling grants.

According to a first aspect of the present invention there is a method of operating a communication device, comprising transmitting a first signal, adapting, in response to receiving a second signal, a transmission parameter of the first signal in accordance with a value indicated by the second signal, and adapting, in response to receiving a third signal, a transmission parameter of the first signal relative to a reference value, the method further comprising selecting the reference value, the reference value being selected from the value of a first transmission parameter at a first preceding time instant and the value of a second transmission parameter at a second preceding time instant, the selection being dependent on a property of at least one of the second and third signals.

According to a second aspect of the present invention there is provided a communication device comprising a transmitter for transmitting a first signal, a control means for adapting, in response to receiving a second signal, a transmission parameter of the first signal in accordance with a value indicated by the second signal and for adapting, in response to a third signal, a transmission parameter of the first signal relative to a reference value, the communication device further comprising selection means for selecting, dependent on a property of at least one of the second and third signals, the reference value from one of the value of a first transmission parameter at a first preceding time instant and the value of a second transmission parameter at a second preceding time instant.

According to a third aspect of the present invention there is provided a method of operating a communication system comprising a scheduler and at least one communication device, the method comprising the communication device transmitting a first signal, adapting, in response to receiving a second signal generated by the scheduler, a transmission parameter of the first signal in accordance with a value indicated by the second signal, and adapting, in response to receiving a third signal generated by the scheduler, a transmission parameter of the first signal relative to a reference value, the method further comprising the communication device selecting the reference value, the reference value being selected from the value of a first transmission parameter at a first preceding time instant and the value of a second transmission parameter at a second preceding time instant, the selection being dependent on a property of at least one of the second and third signals.

According to a fourth aspect of the present invention there is provided a communication system comprising a scheduler for generating second and third signals as required and a communication device in accordance with the third aspect of the present invention.

In an embodiment of the method in accordance with the present invention, in which the communication device may be suitable for use in a UMTS system, the second and third signals comprise respectively an absolute grant (AG) and a relative grant (RG), and the selection of the reference value for the relative grants depends on a property of at least one grant (either absolute or relative).

The selection may be related to for example whether a grant is applied to all the HARQ processes or an individual HARQ process.

If the grant whose property is in question is an absolute grant, then in the method in accordance with the invention, if the absolute grant applicable to TTI 2 in the example discussed with reference to FIGS. 3 and 4 possessed the property in question, this AG would take precedence over the RG received for TTI 9. This would mean that the change in SG in TTI 9 would in this case occur relative to the value of the SG in TTI 8, that is SG level 32 in FIGS. 3 and 4, rather than relative to the value of the SG in TTI1, that is the SG level 30 in FIGS. 3 and 4.

A method in accordance with the present invention may be used in a system in which data is transmitted in groups of transmission time intervals (TTI). In such a system the reference value may be selected from a set of values comprising at least the value of a first transmission parameter in a first preceding TTI and the value of a second transmission parameter in a second preceding TTI. The first preceding TTI may be the correspondingly numbered TTI in the preceding group of TTIs. The second preceding TTI may be one of the immediately preceding TTI, the most recent preceding TTI in which a second signal (or an absolute grant) was applied, the earliest TTI in which a second signal (or an absolute grant) was applied after the first preceding TTI, the most recent preceding TTI in which a third signal (or a relative grant) was applied, the earliest TTI in which a third signal (or a relative grant) was applied after the first preceding TTI, the TTI in which the lowest-valued signal (or grant) was applied after the first preceding TTI, and the TTI in which the highest-valued signal (or grant) was applied after the first preceding TTI. Optionally the first and second preceding TTIs are the same.

The reference value may be selected to be the value of the second transmission parameter in the second preceding TTI if the user equipment receives a signal (or grant) applicable to a TTI later than the first preceding TTI with the property of being absolute, with the reference value otherwise being selected to be the value of the first transmission parameter in the first preceding TTI.

In an embodiment of the method in accordance with the present invention data is transmitted in a plurality of processes, and the reference value is selected by a user equipment depending on whether a preceding second signal (or absolute grant) applicable to a TTI later than the first preceding TTI has the property of being an all process second signal (or absolute grant) or a single process second signal (or absolute grant).

In the case of an all process second signal (or absolute grant) the reference value may be selected to be the value of the second transmission parameter in the second preceding TTI and in the case of a single process second signal (or absolute grant) the reference value may be selected to be the value of the first transmission parameter in the first preceding TTI.

At least one of the first and second transmission parameters may comprise one of the following: the power available to transmit data, the rate available for data transmission, the ratio between the power available for data transmission and the power used for transmission of a control signal, the power used for data transmission, the rate used for data transmission and the ratio between the power used for data transmission and the power used for transmission of a control signal.

In another embodiment of the method in accordance with the present invention the first transmission parameter is the ratio between the power used for data transmission and the power used for transmission of a control signal, and the second transmission parameter is the ratio between the power available for data transmission and the power used for transmission of a control signal.

In a further embodiment of the method in accordance with the present invention the relevant property of a second signal (or an absolute grant) is its value compared to the value of the first transmission parameter in the first preceding TTI. The reference value may be selected to be the value of the second transmission parameter in the second preceding TTI in response to the second signal (or absolute grant) having a value below the value of the first transmission parameter in the first preceding TTI, or may be selected to be the value of the first transmission parameter in the first preceding TTI in response to the second signal (or absolute grant) having a value above the value of the first transmission parameter in the first preceding TTI.

In yet a further embodiment of the method in accordance with the present invention the property of the one or more grants is related to the third signal (or relative grant). In operation the reference value is selected to be a first value in response to the third signal (or relative grant) being a decrement, and the reference value is selected to be a second value in response to the third signal (or relative grant) being an increment.

The first value may be the lower of the value of the first transmission parameter in the first preceding TTI and the value of the second transmission parameter in the second preceding TTI, and the second value may be one of the value of the first transmission parameter in the first preceding TTI, the value of the second transmission parameter in the second preceding TTI, and the higher of the value of the first transmission parameter in the first preceding TTI and the value of the second transmission parameter in the second preceding TTI.

In yet another embodiment of the method in accordance with the present invention, the communication device may be suitable for operation in a UMTS system, the second signal comprises an absolute grant and the third signal comprises a relative grant, the reference value is selected to be a first value if a single-process absolute grant received in a predetermined time window is identified with the same HARQ (Hybrid Automatic Repeat Request) process as the relative grant in question, and the reference value is selected to be a second value if a single-process absolute grant received in the predetermined time window is identified with a different HARQ (Hybrid Automatic Repeat Request) process from that of the relative grant in question.

According to a fifth aspect of the present invention there is provided a method of operating a communication system comprising a scheduler and a user equipment, the method comprising controlling the user equipment with combinations of absolute and relative grants, wherein the priority given to the absolute grants or the relative grants is dependent on a property of one or more of the grants.

BRIEF DESCRIPTION OF DRAWINGS

The present invention will now be described, by way of example, with reference to the accompanying drawings, wherein.

In the drawings the same reference numerals have been used to indicate corresponding features.

MODES FOR CARRYING OUT THE INVENTION

As FIGS. 1 to 4 have already been described in the preamble of the this specification they will not described again in the following description of FIGS. 5 to 7.

Figure 1:
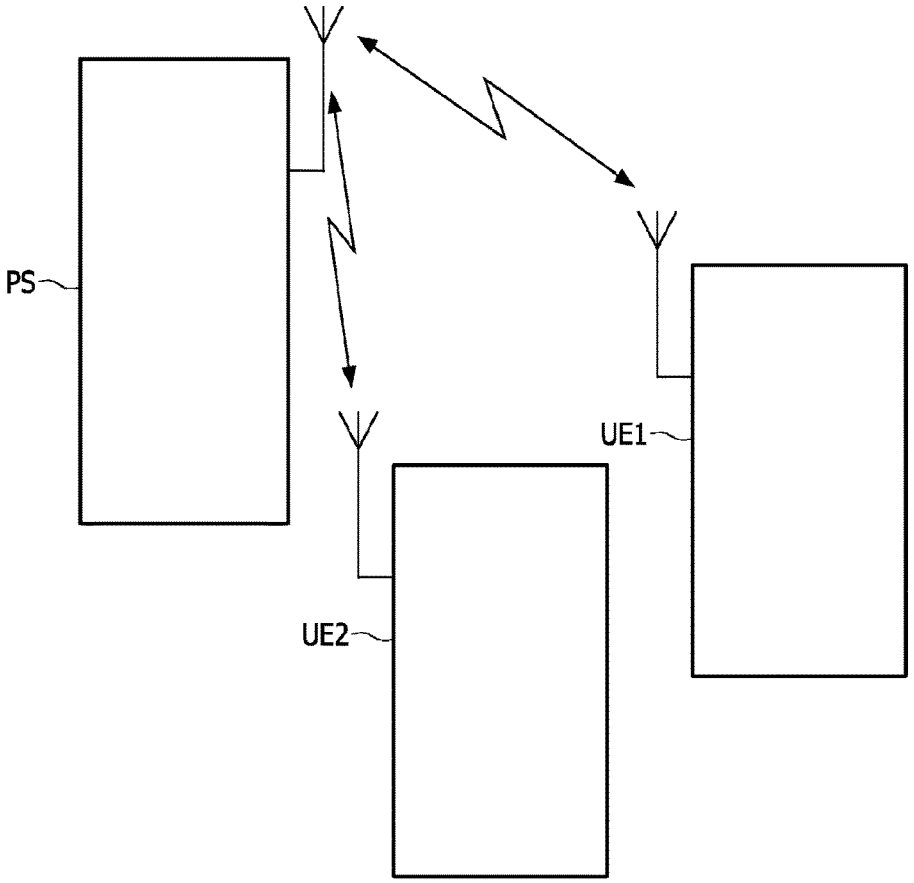
FIG. 1 is a simplified block schematic diagram of a communication system.
Figure 2:
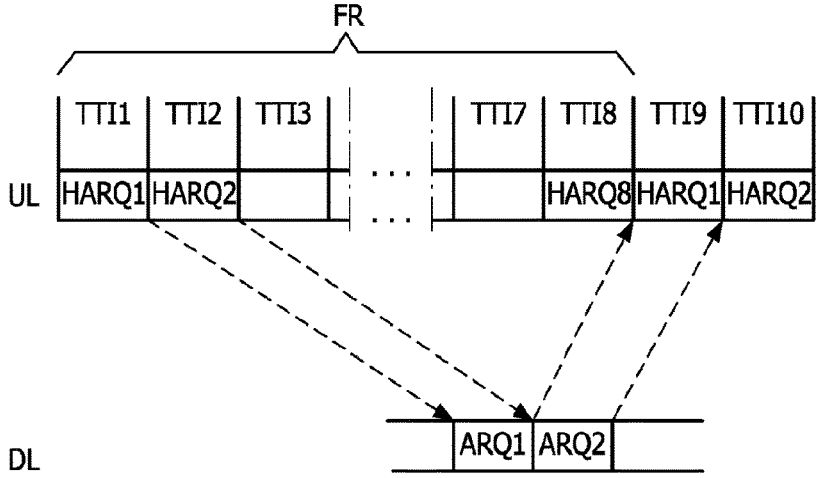
FIG. 2 illustrates HSUPA.
Figure 3:
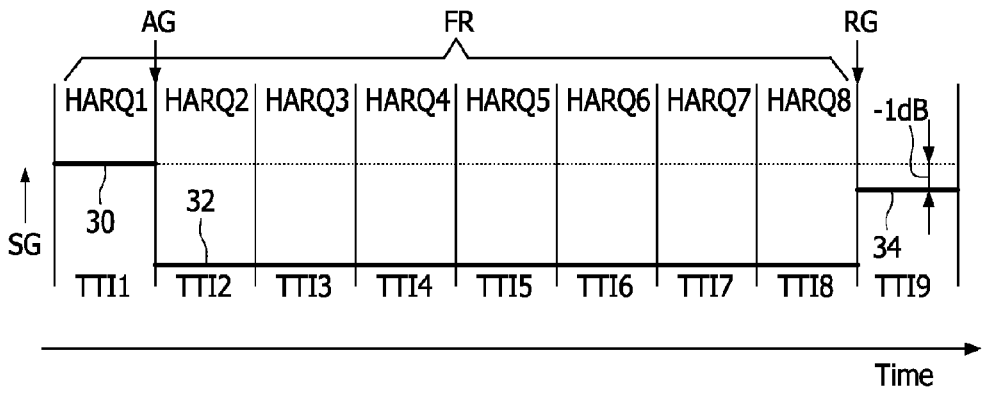
FIG. 3 is a graph showing behaviour with the relative grant "down"
Figure 4:
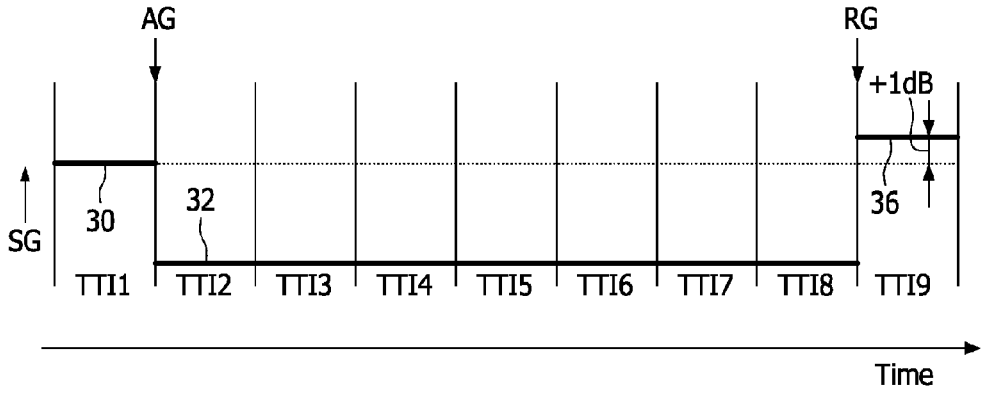
FIG. 4 is a graph showing behaviour with the relative grant "up"
Figure 5:
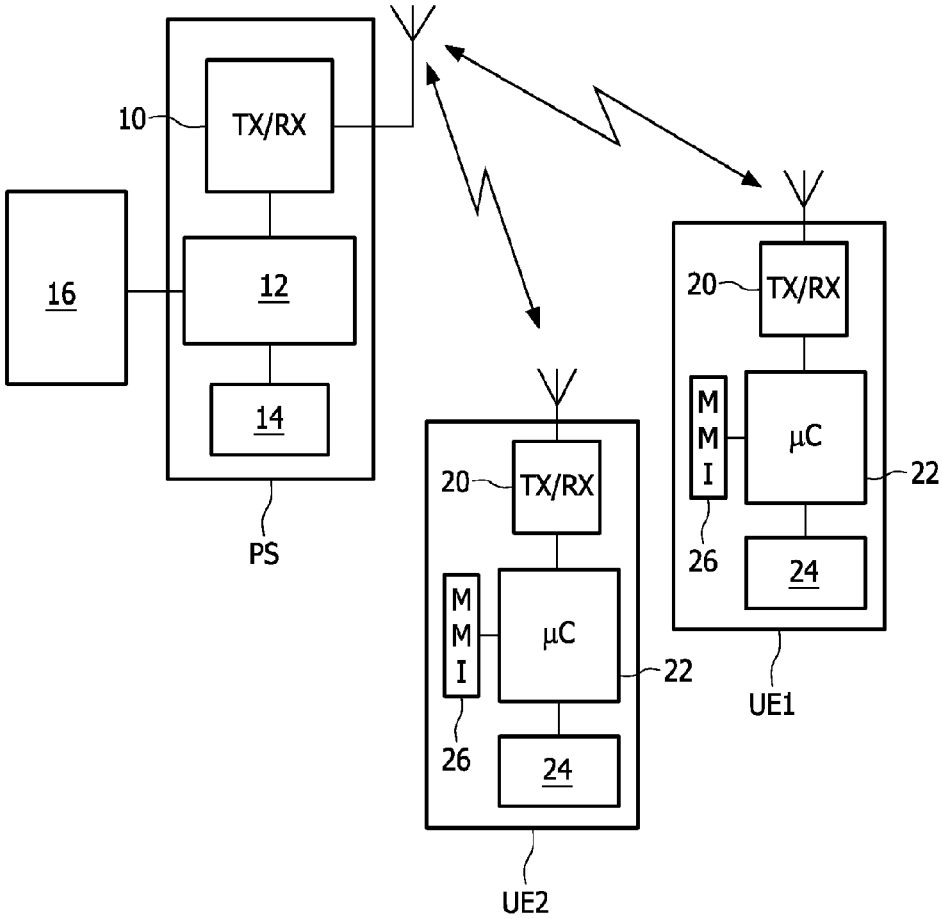
FIG. 5 is a simplified block schematic diagram of a UMTS system architecture made in accordance with the present invention.

Referring to FIG. 5, the UMTS system architecture comprises at least one primary (or base) station PS and a plurality of secondary stations, generally referred to as User Equipments (UEs), UE1, UE2. The or each primary station PS includes a transceiver 10 which is coupled to a scheduler 12 comprising a processor operating in accordance with program software for controlling the multiple UEs in its service area by sending control transmissions on one or more scheduling grant channels. The primary station further comprises a storage means 14 for storing data received from a data source 16 and other information, for example control software, relating to the operation of the system. Each of the UEs, UE1, UE2, comprises a transceiver 20, a processor 22 for controlling the operation of the UE and a storage means 24 for storing data and control software. A user interface 26 is coupled to the processor 22. The user interface 26 comprises a keypad, video display screen, microphone and loudspeaker.

Figure 6:
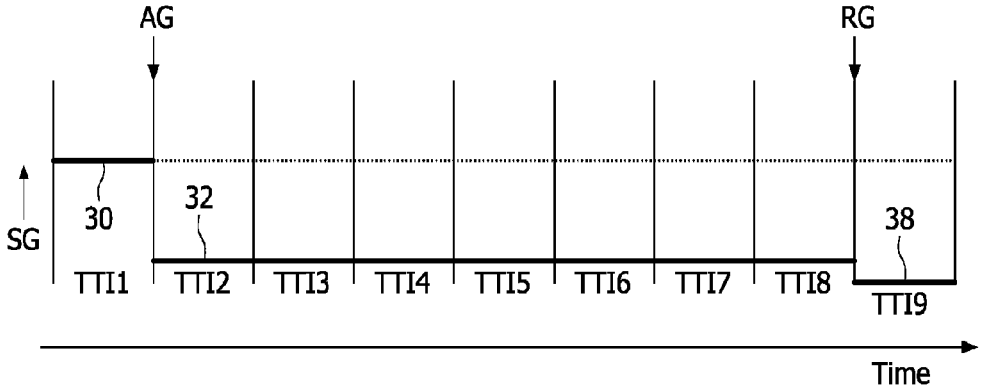
FIG. 6 is a graph illustrating behaviour in accordance with the method of the present invention for a case of an all-process absolute grant.

In the example of FIG. 6, the reference value for the relative grant is dependent on whether the preceding absolute grant AG is an "all-process grant" or a "single-process" grant. In this case, a UE operating in accordance with the invention would behave as shown in FIG. 6 if the AG for TTI 2 was an all-process absolute grant (interpreting the all-process nature of the grant as implying a hard limit on the data transmission power of the UE), while the UE's behaviour would remain as in FIG. 3 if the AG for TTI 2 was a single-process absolute grant. In other words, the RG received for TTI 9 has priority over the AG received for TTI 2 if the AG for TTI 2 is a single-process grant, whereas the AG for TTI 2 has priority over the RG for TTI 9 if the AG for TTI 2 is an all-process grant and the change in SG for TTI 9, that is to a SG level 38, is made relative to the SG level 32 in TTI 8. The indication to use a lower serving grant sent to all the HARQ processes in a UE thus overrides the attempt by the scheduler 12 (FIG. 5) to send a relative grant command which would increase the currently transmitted power in the UE above the limit set by the received absolute grant.

Figure 7:
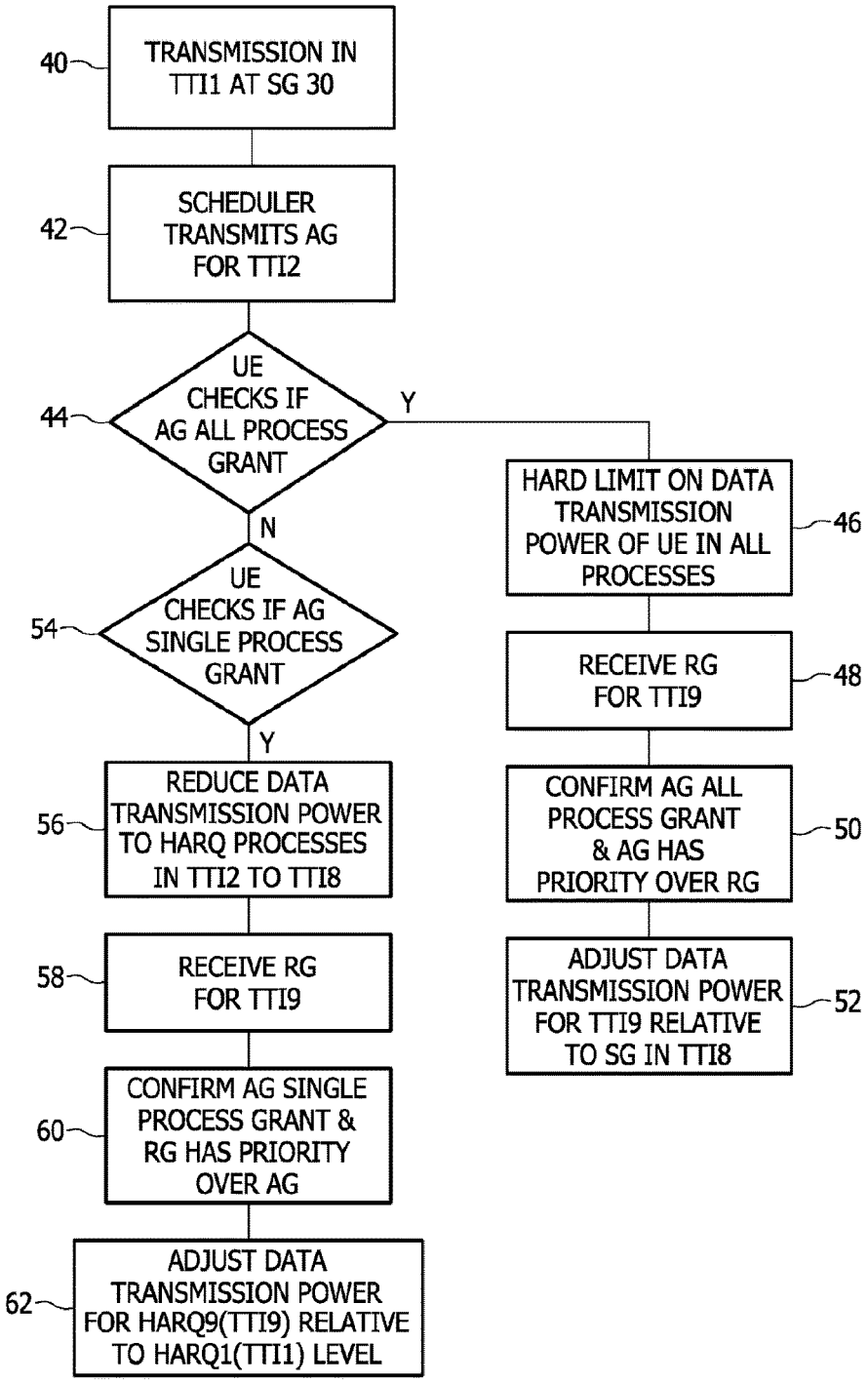
FIG. 7 is a flow chart illustrating an embodiment of the method in accordance with the present invention.

Referring to the flow chart shown in FIG. 7, block 40 denotes a UE making a data transmission in TTI 1 at SG 30. Block 42 denotes the scheduler 12 transmitting an AG for TTI 2. Block 44 denotes the UE checking if the AG is an all process grant. If it is (Y), then in block 46 the UE applies a hard limit on data transmission power in all processes. Block 48 denotes the UE receiving a RG in TTI 9. Block 50 confirms that the previous AG was an all process absolute grant and that the AG has priority over the RG. Block 52 denotes the UE adjusting the SG by one step or increment relative SG level in TTI 8.

If the answer in the block 44 was negative (N) then in block 54 a check is made by the UE that the AG is a single process absolute grant. If the answer is affirmative (Y) the UE reduces the data transmission power of processes HARQ 2 to 8 to SG level 32. Block 58 denotes the UE receiving a RG for TTI 9. Block 60 confirms that the previous AG was a single process absolute grant and that the RG has priority over the AG. Block 62 denotes the UE adjusting the SG by one step or increment relative to the SG level 30 in TTI 1.

In other embodiments, the relevant property of an absolute grant may be its value compared to the default reference point (i.e. TTI 1 in the examples above) for the relative grant whose priority is to be determined. For example, if an AG received since the reference point has a value below the value of the SG at the reference point, the AG could take priority, while if the AG had a value above the value of the SG at the reference point then the RG could take priority.

Note that the AG taking priority could in some embodiments mean that the RG sets the SG relative to the value of the AG, while in other embodiments the AG taking priority could mean that the RG sets the SG relative to the most recent value of the SG.

In other embodiments, the relevant property of the AG may be whether it is identified with the same HARQ process as the RG in question. For example, AGs which are "single-process" where the single process is the same HARQ process as the RG could take priority over the RG, while the RG could take priority (as defined above) if the only AGs received since the reference point are "single-process" where the single process is different from the process corresponding to the RG. "All-process" AGs could be handled either way in this case, depending on the embodiment.

In other embodiments, the relevant property may relate to the RG itself. For example, if the RG is "down" it is applied relative to the lower of the reference point SG value and the most recent SG value, while if the RG is "up" it is applied relative to the reference point SG value.

In another aspect of the invention, a user equipment UE may receive a relative grant and an absolute grant which are both applicable to the same TTI. In this case the UE may select which of the grants to act upon depending on whether the absolute grant is all-process or single-process, or which is the lower or the higher of the two grants. For example, if the AG is single-process, the UE may act upon the RG relative to the default reference point in TTI 1 and ignore the AG, whereas if the AG is all-process the UE may set the SG according to the AG and ignore the RG, or vice versa. Alternatively, the UE may for example set the SG to the lower of the value given by the AG and the value given by applying the RG to the default reference point.

Although the present invention has been described with reference to data transmissions on an uplink it is to be understood that the teachings of the present invention can be applied to downlink transmissions and to systems other than UMTS.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of data transmission and which may be used instead of or in addition to features already described herein.

INDUSTRIAL APPLICABILITY

Mobile communication systems, such as UMTS.

The invention claimed is:

1. A method of operating a communication device, comprising transmitting a first signal with a transmission parameter selected from a group consisting of: a power and a rate, adapting, in response to receiving a second signal, the transmission parameter of the first signal in accordance with a value indicated by the second signal, and adapting, in response to receiving a third signal, the transmission parameter of the first signal relative to a reference value, the method further comprising selecting the reference value from a value of a first transmission parameter at a first preceding time instant and a value of a second transmission parameter at a second preceding time instant, the selection being dependent on a property of at least one of the second and third signals.

2. The method as claimed in claim 1, in which the first signal comprises data transmitted in groups of transmission time intervals (TTI), wherein the first preceding time instant is a first preceding TTI and the second preceding time instant is a second preceding TTI.

3. The method as claimed in claim 2, wherein the first preceding TTI is [the] *a* correspondingly numbered TTI in a preceding group of TTIs.

4. The method as claimed in claim 2, wherein the second TTI is one of: an immediately preceding TTI, a most recent preceding TTI in which a second signal was applied, an earliest TTI in which a second signal was applied after the first preceding TTI, a most recent preceding TTI in which a third signal was applied, an earliest TTI in which a third signal was applied after the first preceding TTI, a TTI in which [the] *a* lowest-valued one of the second and third signals was applied after the first preceding TTI, and a TTI in which a highest-valued one of the second and third signals was applied after the first preceding TTI.

5. The method as claimed in claim 2, wherein the first and second preceding TTIs are the same.

6. The method as claimed in claim 1, wherein the reference value is selected to [he] *be* one of: the value of the second transmission parameter in the second preceding TTI if the communication device receives a second signal applicable to a TTI later than the first preceding TTI, and the value of the first transmission parameter in the first preceding TTI.

7. The method as claimed in claim 1, wherein [the] data is transmitted in a plurality of processes, and wherein the reference value is selected depending on whether a preceding second signal applicable to a TTI later than the first preceding TTI has the property of being an all process second signal or a single process second signal.

8. [A] The method as claimed in claim 7, wherein in [the] *a* case of an all process second signal the reference value is selected to be the value of the second transmission parameter in the second preceding TTI and in the case of a single process second signal the reference value is selected to be the value of the first transmission parameter in the first preceding TTI.

9. The method as claimed in claim 1, wherein at least one of the first and second transmission parameters is a power available to transmit data.

10. The method as claimed in claim 1, wherein at least one of the first and second transmission parameters is a rate available for data transmission.

11. The method as claimed in claim 1, wherein at least one of the first and second transmission parameters is a ratio between the power available for data transmission and the power used for transmission of a control signal.

12. The method as claimed in claim 1, wherein at least one of the first and second transmission parameters is a power used for data transmission.

13. The method as claimed in claim 1, wherein at least one of the first and second transmission parameters is a rate used for data transmission.

14. The method as claimed in claim 1, wherein at least one of the first and second transmission parameters is a ratio between the power used for data transmission and the power used for transmission of a control signal.

15. The method as claimed in claim 1, wherein the first transmission parameter is a ratio between the power used for data transmission and a power used for transmission of a control signal, and the second transmission parameter is a ratio between the power available for data transmission and a power used for transmission of a control signal.

16. The method as claimed in claim 1, wherein [the] *a* relevant property of the second signal is its value compared to the value of the first transmission parameter in the first preceding TTI.

17. The method as claimed in claim 16, wherein the reference value is selected to be the value of the second transmission parameter in the second preceding TTI in response to the second signal having a value below the value of the first transmission parameter in the first preceding TTI, and wherein the reference value is selected to be the value of the first transmission parameter in the first preceding TTI in response to the second signal having a value above the value of the first transmission parameter in the first preceding TTI.

18. The method as claimed in claim 1, wherein the property is related to the third signal, wherein in response to the third signal being a decrement, the reference value is selected to be a first value, and in response to the third signal being an increment the reference value is selected to be a second value.

19. The method as claimed in claim 18, wherein the first value is the lower of the value of the first transmission parameter in the first preceding TTI and the value of the second transmission parameter in the second preceding TTI, and wherein the second value is one of the value of the first transmission parameter in the first preceding TTI, the value of the second transmission parameter in the second preceding TTI, and the higher of the value of the first transmission parameter in the first preceding TTI and the value of the second transmission parameter in the second preceding TTI.

20. The method as claimed in claim 1, wherein the second signal comprises an absolute grant (AG) and the third signal comprises a relative grant (RG), wherein the reference value is selected to be a first value if a single-process absolute grant received in a predetermined time window is identified with a same [HARM] *HARQ* (Hybrid Automatic Repeat Requests) process as the relative grant in question, and wherein the reference value is selected to be a second value if a single-process absolute grant received in the predetermined time window is identified with a different HARQ [(Hybrid Automatic Repeat Request)] process from that of the relative grant in question.

21. [Software] *A non-transitory computer-readable medium comprising instructions executable by a processor* for controlling the operation of a communication device [in accordance with the method as claimed in claim 1], *the instructions when executed;*

*transmitting a first signal with a transmission parameter selected from a group consisting of: a power and a rate,*

*adapting, in response to receiving a second signal, the transmission parameter of the first signal in accordance with a value indicated by the second signal, and*

*adapting, in response to receiving a third signal, the transmission parameter of the first signal relative to a reference value, the method further comprising*

*selecting the reference value from a value of a first transmission parameter at a first preceding time instant and a value of a second transmission parameter at a second preceding time instant, the selection being dependent on a property of at least one of the second and third signals.*

22. A communication device comprising a transmitter for transmitting a first signal with a transmission parameter selected from a group consisting of: a power and a rate, a control means for adapting, in response to receiving a second signal, the transmission parameter of the first signal in accordance with a value indicated by the second signal and for adapting, in response to a third signal, the transmission parameter of the first signal relative to a reference value, the communication device further comprising selection means for selecting, dependent on a property of at least one of the second and third signals, the reference value from one of: a value of a first transmission parameter at a first preceding time instant and a value of a second transmission parameter at a second preceding time instant.

23. The device as claimed in claim 22, in which the first signal comprises data transmitted in groups of transmission time intervals (TTI), wherein the first preceding time instant is a first preceding TTI and the second preceding time instant is a second preceding TTI.

24. The device as claimed in claim 23, wherein the first preceding *TTI* is a correspondingly numbered TTI in the preceding group of TTIs.

25. The device as claimed in claim 22, wherein at least one of the first and second transmission parameters is a power available to transmit data.

26. The device as claimed in claim 22, wherein at least one of the first and second transmission parameters is a rate available for data transmission.

27. The device as claimed in claim 22, wherein at least one of the first and second transmission parameters is a ratio between a power available for data transmission and a power used for transmission of a control signal.

28. The device as claimed in claim 22, wherein at least one of [he] *the* first and second transmission parameters is a power used for data transmission.

29. The device as claimed in claim 22, wherein at least one of the first and second transmission parameters is a rate used for data transmission.

30. The device as claimed in claim 22, wherein at least one of the first and second transmission parameters is a ratio between the power used for data transmission and a power used for transmission of a control signal.

31. The device as claimed in claim 22, wherein [the] *a* relevant property of a second signal is its value compared to a value of the first transmission parameter in the first preceding TTI.

32. A method of operating a communication system comprising a scheduler and at least one communication device, the method comprising the communication device transmitting a first signal [with] *using* a transmission parameter, *wherein the transmission parameter is* selected from a group consisting of: a power and a rate, adapting, in response to receiving a second signal generated by the scheduler, the transmission parameter of the first signal in accordance with a value indicated by a second signal, and adapting, in response to receiving a third signal generated by the scheduler, the transmission parameter of the first signal relative to a reference value, the method further comprising the communication device selecting the reference value one of: a value of a first transmission parameter at a first preceding time instant and a value of a second transmission parameter at a second preceding time instant, the selection being dependent on a property of at least one of the second and third signals.

33. The method as claimed in claim 32, in which the first signal comprises data transmitted in groups of transmission time intervals (TTI), wherein the first preceding time instant is a first preceding TTI and the second preceding time instant is a second preceding TTI.

34. The method as claimed in claim 33, wherein the first preceding TTI is a correspondingly numbered TTI in the preceding group of TTIs.

35. The method as claimed in claim 32, wherein at least one of the first and second transmission parameters is a power available to transmit data.

36. The method as claimed in claim 32, wherein at least one of the first and second transmission parameters is a rate available for data transmission.

37. The method as claimed in claim 32, wherein at least one of the first and second transmission parameters is a ratio between a power available for data transmission and a power used for transmission of a control signal.

38. The method as claimed in claim 32, wherein at least one of the first and second transmission parameters is a power used for data transmission.

39. The method as claimed in claim 32, wherein at least one of the first and second transmission parameters is a rate used for data transmission.

40. The method as claimed in claim 32, wherein at least one of the first and second transmission parameters is a ratio between the power used for data transmission and a power used for transmission of a control signal.

41. The method as claimed in claim 32, wherein [the] *a* relevant property of a second signal is its value compared to a value of the first transmission parameter in the first preceding TTI.

42. A communication system comprising a scheduler for generating second and third signals and a communication device as claimed in claim 22.

43. A method of operating a communication system comprising a scheduler and a user equipment, the method comprising:

providing [a] *the* scheduler including a processor operating in accordance with program software for controlling the user equipment in a service area by sending control transmissions on one or more scheduling channels; and controlling the user equipment with combinations of absolute (AG) and relative (RG) grants, wherein a priority given to the absolute grants or the relative grants is dependent on a property of one or more of the respective absolute grant or the relative grant; and at least one transmission parameter of a next transmission frame is determined based on the priority of the grant and [the] at least one transmission parameter in a preceding transmission frame, said *at least one* transmission parameter *of the next transmission frame* being selected from a *group* consisting of: a power and a rate*;*

*wherein the at least one transmission parameter of a next transmission frame is determined by selecting the lower of a second transmission parameter and a third transmission parameter.*

44. The method as claimed in claim 43, wherein in response to a user equipment receiving a relative grant and an absolute grant both applicable to a same transmission time interval, the user equipment selects one of the received relative grant and absolute grant depending upon whether the absolute grant is all-process or single process.

45. The method as claimed in claim 43, wherein in response to a user equipment receiving a relative grant and an absolute grant both applicable to a same transmission time interval, the user equipment selects one of the received relative grant and absolute grant depending upon which is the lower or higher of the received relative grant and absolute grant.

46. [Software] *A non-transitory computer readable medium comprising instructions executable by a processor* for controlling the operation of a communication system [in accordance with the method as claimed in claim 43] *comprising a scheduler and a user equipment, the instructions when executed:*

*providing the scheduler including a processor operating in accordance with program software for controlling the user equipment in a service area by sending control transmissions on one or more scheduling channels; and*

*controlling the user equipment with combinations of absolute (AG) and relative (RG) grants, wherein a priority given to the absolute grants or the relative grants is dependent on a property of one or more of the respective absolute grant or the relative grant; and at least one transmission parameter of a next transmission frame is determined based on the priority of the grant and the at least one transmission parameter in a preceding transmission frame, said transmission parameter being selected from a group consisting of: a power and a rate.*

*47. A communication device comprising*

*a transmitter configured to transmit a first signal using a transmission parameter, wherein the transmission parameter is selected from a group consisting of: a power and a rate,*

*a computer processor configured to adapt, in response to receiving a second signal, the transmission parameter of the first signal in accordance with a value indicated by the second signal and for adapting, in response to a third signal, the transmission parameter of the first signal relative to a reference value,*

*the computer processor further configured to select, based on a property of at least one of the second and third signals, the reference value from one of: a value of a first transmission parameter at a first preceding time instant and a value of a second transmission parameter at a second preceding time instant.*

*48. The communication device as claimed in claim 47, wherein the computer processor is a microcontroller.*

*49. The communication device as claimed in claim 47, in which the first signal comprises data transmitted in groups of transmission time intervals (TTI), wherein the first pre-*

*ceding time instant is a first preceding TTI and the second preceding time instant is a second preceding TTI.*

*50. The device as claimed in claim 47, wherein at least one of the first and second transmission parameters is a power available to transmit data.*

*51. The device as claimed in claim 47, wherein at least one of the first and second transmission parameters is a rate available for data transmission.*

*52. The device as claimed in claim 47, wherein at least one of the first and second transmission parameters is a ratio between a power available for data transmission and a power used for transmission of a control signal.*

*53. The device as claimed in claim 47, wherein at least one of the first and second transmission parameters is a power used for data transmission.*

*54. The device as claimed in claim 47, wherein at least one of the first and second transmission parameters is a rate used for data transmission.*

*55. The device as claimed in claim 47, wherein at least one of the first and second transmission parameters is a ratio between the power used for data transmission and a power used for transmission of a control signal.*

*56. The device as claimed in claim 47, wherein a property of the second signal is its value compared to a value of the first transmission parameter in the first preceding TTI.*

*57. A communication device, comprising:*

*a transmitter configured to transmit a first signal based on a first transmission parameter, the first transmission parameter being indicative of a ratio between the power used for data transmission and the power used for transmission of a control signal;*

*a receiver configured to receive a first grant and a second grant, wherein the first grant indicates a change of the first transmission parameter to a second transmission parameter, and wherein the second grant indicates a change of the first transmission parameter to a third transmission parameter, wherein the first grant is an Absolute Grant (AG) and wherein the second grant is a Relative Grant (RG); and*

*a computer processor configured to change the first transmission parameter to an updated transmission parameter by selecting the lower of the second transmission parameter and the third transmission parameter, and*

*wherein the change of the first transmission parameter is relative to a reference value, the reference value being from one of: a value of the first transmission parameter at a first preceding time instant and a value of the second transmission parameter at a second preceding time instant,*

*wherein the transmitter is configured to transmit a second signal using the updated transmission parameter.*

*58. The communication device according to claim 57, further comprising a memory, wherein the first transmission parameter of the first signal is set according to a Serving Grant (SG) variable stored in the memory.*

*59. The communication device according to claim 57, wherein the Relative Grant (RG) indicates an incremental or decremental change to the value of the first transmission parameter to derive the third transmission parameter, and wherein the Absolute Grant (AG) indicates the absolute value of the second transmission parameter.*

*60. The communication device according to claim 59, wherein the computer processor is further configured to determine if the Absolute Grant is an all-process grant or a single-process grant.*

*61. The communication device according to claim 57, wherein the first grant and the second grant are applicable to a same transmission time interval (TTI).*

*62. The communication device according to claim 57, wherein the computer processor is a microcontroller, wherein the transmitter is a radio transmitter, and wherein the receiver is a radio receiver.*

*63. A method of communicating between a secondary station and a primary station in a communication system, the method comprising:*

*transmitting a first signal based on a first transmission parameter, the first transmission parameter being indicative of a ratio between the power used for data transmission and the power used for transmission of a control signal;*

*receiving a first grant and a second grant, wherein the first grant indicates a change of the first transmission parameter to a second transmission parameter, wherein the second grant indicates a change of the first transmission parameter to a third transmission parameter, wherein the first grant is an Absolute Grant (AG), and wherein the second grant is a Relative Grant (RG);*

*changing the first transmission parameter to an updated transmission parameter by selecting the lower of the second transmission parameter and the third transmission parameter;*

*wherein the change of the first transmission parameter is relative to a reference value, the reference value being from one of: a value of the first transmission parameter at a first preceding time instant and a value of the second transmission parameter at a second preceding time instant, and*

*transmitting a second signal using the updated transmission parameter.*

*64. The method of claim 63, wherein the Relative Grant (RG) indicates an incremental or decremental change to the value of the first transmission parameter to derive the third transmission parameter, and wherein the Absolute Grant (AG) indicates the absolute value of the second transmission parameter.*

*65. The method of claim 63, wherein the first grant and the second grant are applicable to a same transmission time interval (TTI).*

*66. A non-transitory computer readable medium having stored thereon instructions that cause computer processing circuitry to:*

*transmit a first signal based on a first transmission parameter, the first transmission parameter being indicative of a ratio between the power used for data transmission and the power used for transmission of a control signal;*

*receive a first grant and a second grant, wherein the first grant indicates a change of the first transmission parameter to a second transmission parameter, wherein the second grant indicates a change of the first transmission parameter to a third transmission parameter, wherein the first grant is an Absolute Grant (AG), and wherein the second grant is a Relative Grant (RG);*

*change the first transmission parameter to an updated transmission parameter by selecting the lower of the second transmission parameter and the third transmission parameter;*

*wherein the change of the first transmission parameter is relative to a reference value, the reference value being from one of: a value of the first transmission parameter*

*at a first preceding time instant and a value of the second transmission parameter at a second preceding time instant, and*

*transmit a second signal using the updated transmission parameter.*

*67. The non-transitory computer-readable medium of claim 66, wherein the Relative Grant (RG) indicates an incremental or decremental change to the value of the first transmission parameter to derive the third transmission parameter, and wherein the Absolute Grant (AG) indicates the absolute value of the second transmission parameter.*

*68. The non-transitory computer-readable medium of claim 66, wherein the first grant and the second grant are applicable to a same transmission time interval (TTI).*

* * * * *